(12) United States Patent
Li et al.

(10) Patent No.: US 7,206,044 B2
(45) Date of Patent: Apr. 17, 2007

(54) DISPLAY AND SOLAR CELL DEVICE

(75) Inventors: Zili Li, Barrington, IL (US); Iwona Turlik, Barrington, IL (US); Kevin W. Jelley, La Grange, IL (US)

(73) Assignee: Motorola, Inc., Schaumburg, IL (US)

( * ) Notice: Subject to any disclaimer, the term of this patent is extended or adjusted under 35 U.S.C. 154(b) by 836 days.

(21) Appl. No.: 10/001,495

(22) Filed: Oct. 31, 2001

(65) Prior Publication Data

US 2003/0081158 A1 May 1, 2003

(51) Int. Cl.
*G02F 1/1335* (2006.01)
(52) U.S. Cl. ........................ 349/113; 136/244; 250/200
(58) Field of Classification Search ................ 348/113; 349/113
See application file for complete search history.

(56) References Cited

U.S. PATENT DOCUMENTS

| | | | | |
|---|---|---|---|---|
| 4,095,217 A | * | 6/1978 | Tani et al. ...................... 345/87 |
| 4,139,279 A | * | 2/1979 | Laesser et al. .............. 349/115 |
| 5,153,760 A | | 10/1992 | Ahmed | |
| 5,404,185 A | * | 4/1995 | Vogeley et al. ............. 353/122 |
| 5,686,017 A | * | 11/1997 | Kobayashi et al. .... 252/299.01 |
| 5,742,367 A | * | 4/1998 | Kozaki ......................... 349/64 |
| 5,838,286 A | | 11/1998 | Pfeiffer et al. | |
| 5,841,738 A | * | 11/1998 | Kamei et al. ................ 368/205 |
| 5,972,240 A | | 10/1999 | Kobayashi et al. | |
| 5,990,995 A | | 11/1999 | Ebihara et al. | |
| 6,204,908 B1 | * | 3/2001 | Hashimoto et al. ......... 349/176 |
| 6,433,847 B1 | | 8/2002 | Minoura | |
| 6,452,088 B1 | * | 9/2002 | Schmidt ...................... 136/244 |
| 6,518,944 B1 | * | 2/2003 | Doane et al. ................. 345/87 |

FOREIGN PATENT DOCUMENTS

| | | |
|---|---|---|
| JP | 4-362917 | 12/1992 |
| JP | 04362917 | * 12/1992 |
| RU | 000/00300 | 2/2001 |
| WO | WO 95/27279 | 10/1995 |

* cited by examiner

*Primary Examiner*—Andrew Schechter
*Assistant Examiner*—Richard Kim

(57) ABSTRACT

Displays such as liquid crystal displays (10), organic light emitting diode displays, and touch sensitive displays (41) are stacked with one or more solar cells (15) such that light passing through the displays will illuminate the light receiving active surface of the solar cells (15). No reflector or polarizer need be used when the liquid crystal display (10) uses cholesteric or polymer dispersed liquid crystals. When using supertwist nematic or twisted nematic liquid crystals, a reflector (21) can be used that comprises a selective color reflector. The resultant display/solar cell can be utilized in combination with a device such as a wireless communications device (62) with the solar cell (15) providing electricity to the display (61), the wireless communications device (62), or both. A mask (71) can be used to occlude surface features on the solar cell (15) as appropriate to provide a substantially uniformly colored appearance.

10 Claims, 2 Drawing Sheets

DISPLAY AND SOLAR CELL DEVICE

FIELD OF THE INVENTION

This invention relates generally to liquid crystal displays, touch sensitive displays, and solar cells and also to wireless communication devices having such displays and solar cells.

BACKGROUND

Various portable devices, including wireless communications devices, utilize a portable energy source such as one or more batteries. Notwithstanding improvements to both battery technology and power consumption of such portable devices, batteries nevertheless represent a finite source of power. Ways to extend (indefinitely if possible) battery life are constantly being sought.

For some devices, solar cells represent a viable supplemental or alternative energy source. Some devices, such as portable calculators, have both sufficiently large available surface area and sufficiently low power needs that some of these devices can be powered entirely by one or more solar cells. Unfortunately, many devices, including for example cellular telephones and other wireless communications devices have both higher power demands and an often limited available surface area for locating a solar cell. As a result, solar cells have not been viewed as a satisfactory supplemental or alternative power source for such devices.

Some prior art suggestions have been made to combine a solar cell with a display such as a liquid crystal display. Such a combination seems attractive since the display will comprise an ordinary part of the device at issue and the solar cell itself would not require additional surface area. Unfortunately, prior art attempts in this regard have been unsatisfactory. In particular, light that finally reaches the active light receiving surface of the solar cell has been sufficiently attenuated as to substantially mitigate the quantity of electrical power that can be provided by the solar cell even under ideal conditions. The small incremental quantities of supplemental power provided through such prior art attempts have been too small to warrant the additional cost and complexity of providing such a combination in most if not all such devices.

Consequently, a continuing need exists for a way to supplement or replace battery power in portable devices including wireless communications devices in a commercially acceptable and cost-effective manner.

BRIEF DESCRIPTION OF THE DRAWINGS

This need and others are substantially met through provision of the display and solar cell device disclosed herein. Various embodiments of this device will be better understood upon making a thorough review and study of the following detailed description, particularly when reviewed in conjunction with the drawings, wherein.

DETAILED DESCRIPTION

Figure 1:
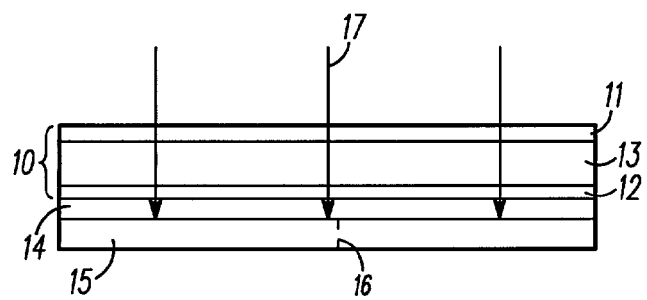
FIG. 1 comprises a side elevational view of a first embodiment configured in accordance with the invention.

Referring now to the figures, FIG. 1 depicts a first embodiment of a display combined with at least one solar cell. In this embodiment, a liquid crystal display 10 includes opposing transparent plates 11 and 12 comprised of glass or suitable plastic material. Liquid crystal 13 fills the space between these two plates 11 and 12 in accordance with well understood prior art knowledge and technique. In this embodiment, the liquid crystal display 10 comprises a so-called reflective embodiment and the liquid crystal comprises either cholesteric liquid crystal or polymer disbursed liquid crystal. Such liquid crystal display technology requires neither a reflector (to reflect light from the back of the liquid crystal display towards the front) nor a polarizer layer. Being free of both these elements, transmission of light from the front of the liquid crystal display 10 through the back thereof can be 75 percent or better (especially for a monochromatic cholesteric liquid crystal display that displays only a single color). Such transmissivisity greatly exceeds, for example, ordinary reflective liquid crystal display technology using super-twisted nematic liquid crystals and metallic reflectors/transflectors that often pass less than six percent of the light that originally enters through the front surface of the liquid crystal display.

A solar cell 15 is disposed proximal to the backside of the liquid crystal display 10 and a coupling layer 14 joins the solar cell 15 to the liquid crystal display 10. The coupling layer 14 can be, for example, comprised of an appropriate transparent adhesive material as appropriate to a particular application. (For some embodiments, and particularly where vertical thickness comprises a critical form factor, the solar cell 15 may be joined directly to the backside of the liquid crystal display 10.) If desired, and depending upon the area of the liquid crystal display 10 itself and/or desired total power output, multiple solar cells 15 can be utilized as suggested by phantom line 16.

The solar cell 15 has a light receiving active surface as understood in the art. For most applications, the appearance of the liquid crystal display 10 will be enhanced if the light receiving active surface has a uniform appearance and typically a dark-colored appearance. For most applications, a black or substantially black colored surface will be optimum.

So configured, at least some of the light 17 passing through the front plate 11 and through the back plate 12 of the reflective liquid crystal display 10 will illuminate the light receiving active surface of the solar cell 15. In this embodiment, where the solar cell 15 has a light receiving active surface that fully extends to the same boundaries as the liquid crystal display 10, at least 75 percent of the light 17 so entering the liquid crystal display 10 will reach the solar cell 15. Consequently, depending upon the total area available, considerable electricity can be provided by the solar cell 15 under various normal viewing conditions.

Figure 3:
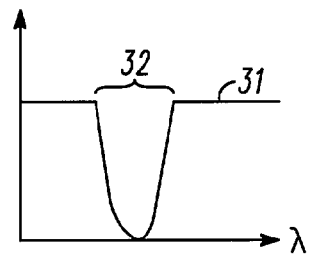
FIG. 3 comprises a graph.
Figure 2:
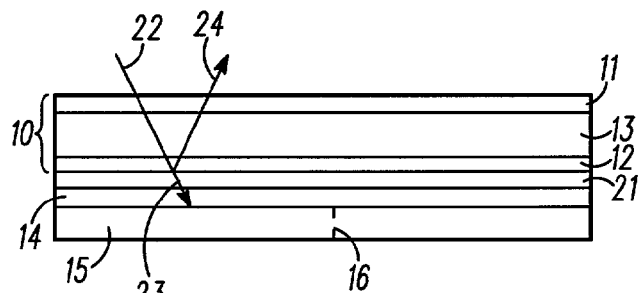
FIG. 2 comprises a side elevational view of a second embodiment configured in accordance with the invention.

Referring now to FIG. 2, a second embodiment will be described. In this embodiment, the liquid crystal display 10 again includes a front plate 11 and a back plate 12. In this embodiment, however, the liquid crystal 13 comprises either supertwist nematic or twisted nematic liquid crystal. Such liquid crystal requires a reflector, and this embodiment therefore provides a reflector 21 juxtaposed substantially parallel against the back plate 12 of the liquid crystal display 10. In this embodiment, however, the reflector 21 does not reflect substantially all incident light 22 back through the liquid crystal display 10 towards the observer. Instead, the reflector 21 comprises a selective color reflector. With momentary reference to FIG. 3, this selective color reflector reflects only a relatively narrow band of wavelengths 32 while transmitting or passing substantially unattenuated light at other wavelengths 31. Holographic film technology, such as Optimax technology developed by Motorola, can serve as such a selective color reflector. The color so selected to be reflected should match the intended to color of the liquid crystal display 10. For example, if the liquid crystal display 10 utilizes green as a display color, then green constitutes the color that should be selectively reflected by the reflector 21. For a multi-colored display, such as a display that uses red, green, and blue, the selective color reflector should reflect wavelengths for all selected colors while allowing unselected colors to pass there-through substantially unattentuated. So configured, in all embodiments, the selective color reflector reflects at least wavelengths that correspond to a first color but not all visible spectrum colors; depending upon the embodiment only a single color may be reflected or multiple colors may be reflected.

As with the first embodiment, a solar cell 15 or cells 16 is/are disposed proximal to the backside of the reflector 21 (again using an appropriate coupling layer 14 to maintain or provide structural integrity). So configured, light 22 entering through the liquid crystal display 10 will be minimally and partially reflected 24 by the reflector 21 and the remainder of the light 22 will pass through the reflector 21 to illuminate the light receiving active surface of the solar cell 15. For such an embodiment, at least 30 percent of the entering light can be expected so pass through the liquid crystal display 10 and the reflector 21. Though this percentage is lower than that achieved with the first embodiment, this performance still greatly exceeds the performance of corresponding prior art displays. As with the first embodiment, the light receiving active surface of the solar cell should again have a substantially uniform dark-colored appearance and preferably a uniform black appearance.

Liquid crystal displays using supertwist nematic or twisted nematic liquid crystals utilize a polarizing layer. For most if not all applications such a polarizing layer is necessary. In that event, the front plate 11 of the liquid crystal display 10 can be configured as a polarizing layer, or a polarizing layer can be disposed outwardly of the front plate 11. In the alternative, or in addition, the back plate 12 of the liquid crystal display 10 can also be configured as a polarizing layer, or a polarizing layer can be disposed inwardly of the back plate 12.

Organic Light Emitting Diodes are another type of display that can support a relevant embodiment in accordance with the invention. Unlike the reflective liquid crystal displays that are discussed above, OLED's do not depend on ambient light to form an image on the display. Instead, OLED's emit their own light to form a desired image. In a conventional OLED, a transparent top electrode (most commonly a thin Indium-Tin-Oxide layer) and a highly reflective bottom electrode (most commonly an aluminum layer) are disposed on either side of a layer of light emitting organic material. When powered, electrons ejected from the bottom electrode and holes ejected from the top electrode move towards the center OLED material layer. Recombination of the electrons and holes in the OLED material creates visible light.

Upward emission of the light will pass directly through the transparent top electrode. The downward emission of light will reflect back from the reflective bottom electrode to combine with the upward emission and travel through the top electrode. As understood in the art, one modulates the degree of power applied to the electrodes to generate the desired image.

The aluminum layer that serves as a mirror in a typical OLED blocks all light (ambient or otherwise) from passing any further. Consequently, a solar cell could not be placed behind such a display with any expectation that any amount of useful light would reach the solar cell. In this embodiment, however, just as with the super twisted nematic and nematic LCD cases described above, a selective color reflector can be substituted for the bottom metallic reflector and a solar cell can then be usefully placed behind the selective color reflector. The reflective wavelength of the selective color reflector should be chosen to correspond to the emission spectrum of the OLED itself. Pursuant to such an embodiment, an acceptable OLED display can be realized while simultaneously allowing an increased amount of non-image forming light (such as ambient light) to pass through the selective color reflector and contact the light receiving surfaces of the solar panel. Transmissivity of the same or more light than is achieved with a reflective super twisted nematic liquid crystal display is reasonably to be expected.

Fully transparent OLED's have also been demonstrated quite recently. With such a device, ambient light can readily pass through the display and contact a solar cell as disposed on the backside of the display. Consequently, this invention can readily be extended to transparent OLED's in a similar fashion as taught below as applied in the context of touch sensitive devices.

Figure 4:
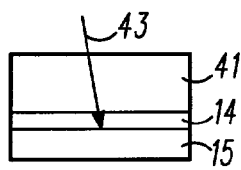
FIG. 4 comprises a side elevational view of a third embodiment configured in accordance with the invention.

Touch sensitive displays are well understood in the art. Touch sensitive displays ordinarily have a back surface that is colored relatively dark with most consumer products having such a display using a gray color. Pursuant to a third embodiment as depicted in FIG. 4, this back surface of a touch sensitive display 41 can be transparent instead such that light 43 can pass through the back of the touch sensitive display 41 to illuminate the light receiving active surface of a solar cell 15 that is disposed proximal to the backside of the touch sensitive display 41. Again, a coupling layer 14 can be provided to integrate the solar cell 15 with the touch sensitive display 41. So configured, a significant percentage of light 43 entering the touch sensitive display 41 will pass through the transparent backside of the touch sensitive display 41 and illuminate the light receiving active surface of the solar cell 15. The surface of the solar cell 15 should again be substantially uniformly colored and can be whatever color is appropriate as the background color for the touch sensitive display (such as gray).

Figure 5:
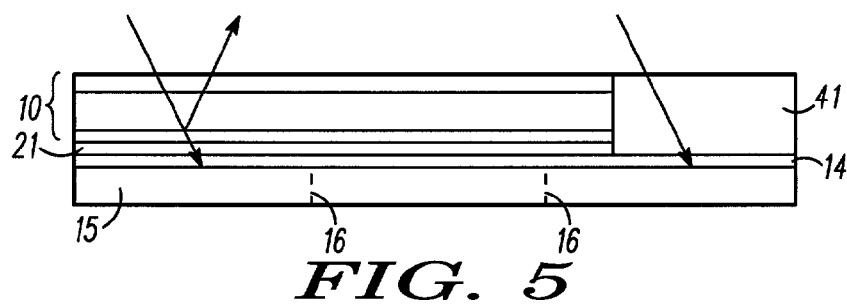
FIG. 5 comprises a side elevational view of a fourth embodiment configured in accordance with the invention.

A fourth embodiment as depicted in FIG. 5 provides a device having both a liquid crystal display 10 and a touch sensitive display 41. Each display can be configured as described above. In the particular embodiment depicted, the liquid crystal display 10 comprises a reflective liquid crystal display using supertwist nematic or twisted nematic liquid crystals. Consequently, this embodiment depicts the liquid crystal display 10 in conjunction with a reflector 21 that comprises a selective color reflector as described above. If this embodiment were to use cholesteric or polymer dispersed liquid crystals, then this reflector 21 could be eliminated. In this embodiment, the liquid crystal display 10 and the touch sensitive display 41 are positioned substantially contiguous to one another. When these displays are contiguous as depicted (or are at least relatively close together) a common coupling layer 14 can be utilized to join a solar cell 15 or solar cells 16 to both displays 10 and 41. As before, the solar cell 15 or solar cells 16 preferably have a substantially uniform dark-colored light-receiving active surface such as a black light-receiving active surface.

So configured, a significant part of the light entering both through the liquid crystal display 10 and the touch sensitive display 41 will pass therethrough and illuminate the light receiving active surface of the solar cell 15 or solar cells 16.

Figure 6:
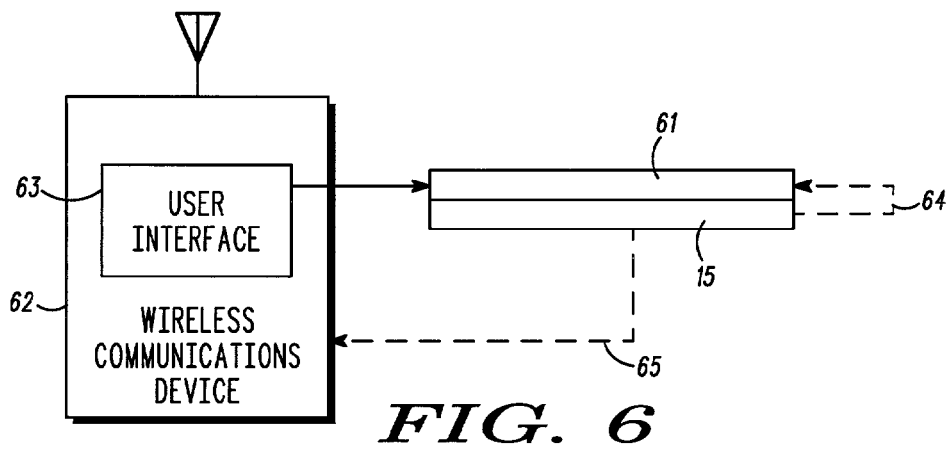
FIG. 6 comprises a block diagram depiction of a wireless communications device including any of the first through fourth embodiments configured in accordance with the invention.

Depending upon ambient light conditions, the electricity generated by the solar cell 15 in the above embodiments can be considerable. FIG. 6 depicts some ways by which these resultant devices can be utilized. In this embodiment, a wireless communications device 62 such as a cellular telephone, a dispatch two-way radio, a one-way or two-way pager, a wireless personal digital assistant, or the like has a user interface 63 that couples to and drives a display 61. This display 61 can be a liquid crystal display using cholesteric or polymer dispersed liquid crystal, a liquid crystal display using supertwist nematic or twisted nematic liquid crystal, or a pressure sensitive display 41 as disclosed above (or juxtaposed combinations as appropriate to a given application). The display 61 passes light to a corresponding solar cell 15 as taught above. Electricity from this solar cell 15 can be coupled 64 to the display 61 to supplement battery power or to substitute for battery power (either temporarily or permanently). In addition, or in the alternative, electricity from this solar cell 15 can be coupled 65 to the wireless communications device 62 to supplement or substitute for battery power as utilized to power the wireless communications device 62. As one particular example, electricity from the solar cell 15 can be coupled to a battery charger circuit and used to charge the batteries for the device in question.

Although only a single solar cell 15 has been depicted for ease of description, it will be readily recognized that a plurality of solar cells could be utilized to provide increased quantities of electricity.

Figure 7:
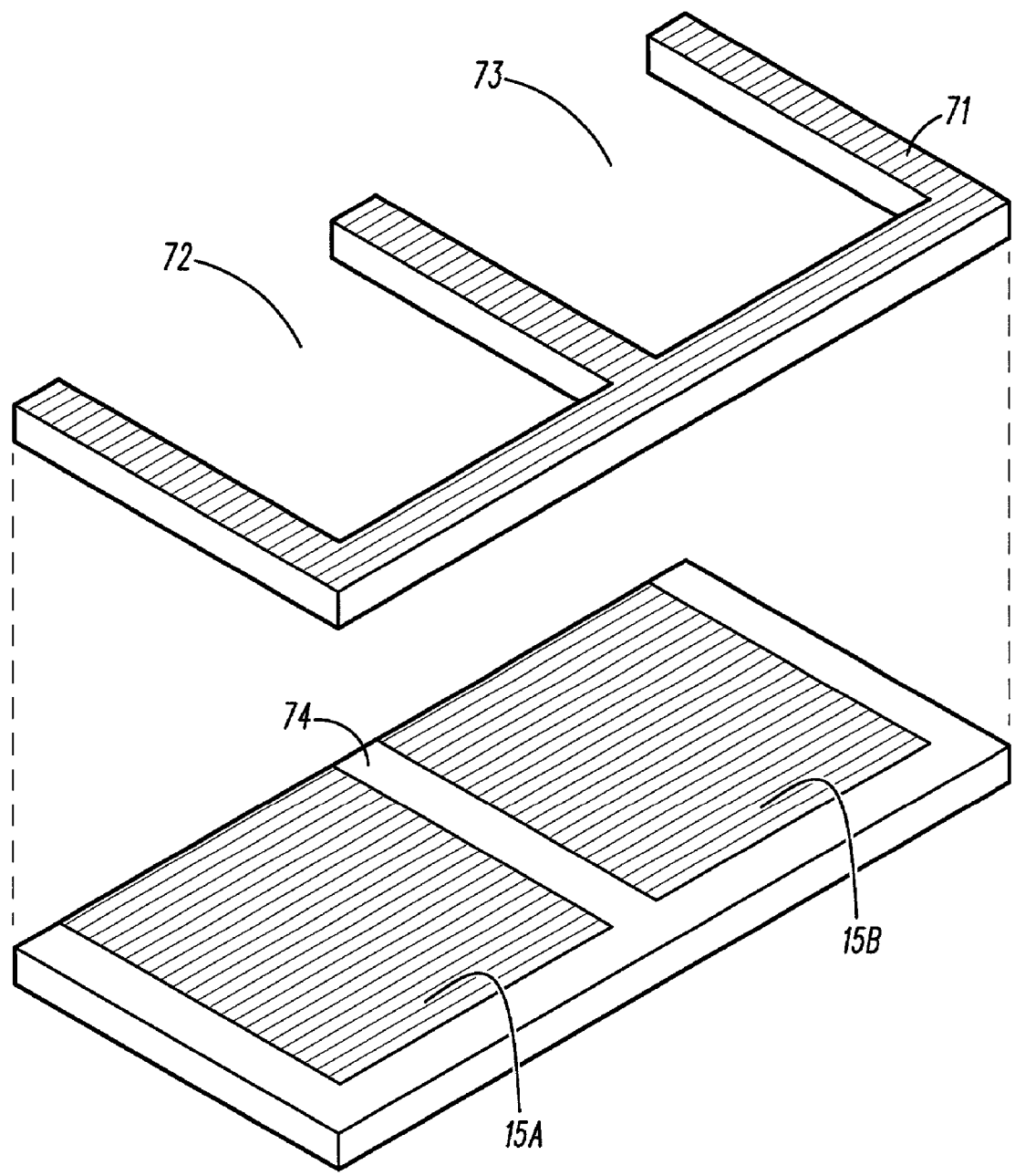
FIG. 7 comprises an exploded perspective view of a mask used in conjunction with solar cells in accordance with an embodiment of the invention.

Many solar cells 15 are provided in an integrated package that does not offer a uniformly colored active surface area. Instead, and referring now to FIG. 7, many such packages provide a plurality of solar cells 15 that are separated by inactive areas 74 made of, for example, copper or other metal. Not only are such materials usually comprised on a color that does not match the color of the active surface regions, but such materials are also usually relatively reflective. As a result, when placing such a package behind a display surface as taught above, under at least some viewing conditions these inactive surface regions can be visible through the display. When visible in this way, the resultant display can be very distracting to a user.

When using such a package, it may therefore be desired to modify the package in order to ensure that the package has a substantially uniform color across at least that part of the package surface that will be at least partially visible through the display. Pursuant to one embodiment, paint masking technologies can be used to deposit paint on the inactive surfaces to thereby match the color of the solar cells 15. Pursuant to another embodiment, a permanent mask 71 matching the color of the active regions of the solar cells 15 can be provided between the solar cells 15 and the display itself. Such a mask 71 should have apertures 72 and 73 to allow light to pass therethrough and contact the active areas 15A and 15B and of the solar cells. So configured, the mask 71 will cooperate with the solar cell package to allow light to pass through to the active regions while presenting a substantially uniformly colored surface as a background to the display. If desired, the permanent mask 71 can be formed as an integral part of the coupling layer 14 described above.

The devices described provide a more commercially acceptable solution than that offered by the prior art. No surface space of the device to be powered need be uniquely dedicated to one or more solar cells. Instead, the surface space dedicated to the display can serve a parallel purpose in serving as a light collection portal for illuminating the active surfaces of the solar cells. Furthermore, relatively ordinary and cost effective liquid crystal display technologies can now be utilized successfully to provide an acceptable display and nevertheless provide an acceptable level of light to a stacked solar cell. As yet one other advantage, the display will offer protection for the solar cell (such protection will likely be especially meaningful for high efficiency solar panels).

Those skilled in the art will recognize that various alterations and substitutions can be made with respect to the embodiments described without departing from the spirit and scope of the inventive concepts set forth. It is understood that the breadth and scope of the invention is defined only by the following claims.

We claim:

1. A device comprising:
   a solar cell;
   a reflective liquid crystal display having a backside and a front side and having one of selectively reflecting cholesteric and polymer dispersed liquid crystal such that at least some light passing from the front side and through the backside of the reflective liquid crystal display will illuminate a substantially uniform dark-colored light-receiving active surface of the solar cell, wherein the solar cell has a light-receiving inactive surface that has a different color than the substantially uniform dark-colored light-receiving active surface; and
   a mask having apertures that substantially conform topographically to the light-receiving active surface of the solar cell and mask surfaces that substantially conform to at least some of the light-receiving inactive surface and that has a color that substantially matches the substantially uniform dark-colored light-receiving active surface of the solar cell.

2. The device of claim 1 and wherein at least some of the light passing from the front side and through the backside of the reflective liquid crystal display will illuminate the light-receiving active surface without first passing through a polarizing layer.

3. The device of claim 1 and further comprising a wireless communications device having a user interface operably coupled to the reflective liquid crystal display.

4. The device of claim 3 wherein the wireless communications device further includes a battery charger that operably couples to the solar cell.

5. The device of claim 3 wherein an electricity output of the solar cell is operably coupled to at least one of the reflective liquid crystal display and the wireless communications device.

6. The device of claim 1 and further comprising a plurality of solar cells.

7. The device of claim 1 wherein the mask comprises paint deposited on the light-receiving inactive surface of the solar cell.

8. A device comprising:
   a solar cell package;

a reflective liquid crystal display having a backside and a front side and having one of selectively reflecting cholesteric and polymer dispersed liquid crystal, wherein at least some light passing from the front side and through the backside of the reflective liquid crystal display will illuminate a substantially uniform dark-colored light-receiving active surface of the solar cell package, and wherein the solar cell package has a surface inactive to light that has a different color than the substantially uniform dark-colored light-receiving active surface; and a mask that covers at least a portion of the surface that is inactive to light, that has apertures that substantially conform topographically to the substantially uniform dark-colored light-receiving active surface of the solar cell package, and has a color that substantially matches a color of the substantially uniform dark-colored light-receiving active surface.

9. The device of claim 8 wherein the mask comprises paint deposited on the solar cell package whereat the mask covers at least a portion of the surface that is inactive to light.

10. The device of claim 8 wherein the solar cell package comprises one or more solar cells.

* * * * *